United States Patent
Yamashita et al.

(10) Patent No.: US 7,317,790 B2
(45) Date of Patent: Jan. 8, 2008

(54) METHOD FOR TRANSMITTING JOBS BETWEEN COMPUTER SYSTEMS, AND COMPUTER SYSTEM AND PROGRAM THEREFOR

(75) Inventors: Yuhji Yamashita, Yamato (JP); Hiroshige Ochimizu, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 10/210,005

(22) Filed: Jul. 31, 2002

(65) Prior Publication Data

US 2003/0028398 A1    Feb. 6, 2003

(30) Foreign Application Priority Data

Jul. 31, 2001    (JP)    ............................. 2001-231301

(51) Int. Cl.
*H04M 11/00*    (2006.01)

(52) U.S. Cl. ............................... 379/102.01; 379/90.01

(58) Field of Classification Search ...............................
379/102.01–102.07, 106.01, 106.02, 90.01, 379/93.07

See application file for complete search history.

(56) References Cited

U.S. PATENT DOCUMENTS 6,480,586 B1 *    11/2002    Hayes et al. ............    379/102.02

FOREIGN PATENT DOCUMENTS

| JP | 07-264323 | 10/1995 |
|----|-----------|---------|
| JP | 09-200318 | 7/1997  |
| JP | 10-294759 | 11/1998 |
| JP | 11-164011 | 6/1999  |
| JP | 2000-115403 | 4/2000 |
| JP | 2000-332903 | 11/2000 |
| JP | 2001-036668 | 2/2001 |
| JP | 2001-125821 | 5/2001 |

* cited by examiner

*Primary Examiner*—Stella Woo
(74) *Attorney, Agent, or Firm*—Gerald R. Woods

(57) ABSTRACT

A central system can quickly pass on job requests intended for remote systems with minimal costs and delays. When a job request for a remote system is received, the central system initiates a conventional telephone call to the remote system. At the remote system, a communications terminal logs the incoming call without allowing it to be completed. When the call is refused, the central system terminates the call attempt. The remote system analyzes the logged call information to determine whether the call originated with the central system. If it did, the remote system, generates an HTTP request which is transmitted to the central system via a public computer network such as the Internet. The central system responds to the HTTP request by retrieving the job request from storage and passing it on to the remote system via the public computer network in the form of an HTTP response.

10 Claims, 3 Drawing Sheets

METHOD FOR TRANSMITTING JOBS BETWEEN COMPUTER SYSTEMS, AND COMPUTER SYSTEM AND PROGRAM THEREFOR

FIELD OF THE INVENTION

The present invention relates to a method for transmitting job assignments between computer systems, and a computer system and a program therefor. In particular, the present invention relates to an effective technique for quickly transmitting a notification of the occurrence of a job from a server system in a network center to a home gateway that is connected to the Internet by a dial-up connection.

BACKGROUND OF THE INVENTION

A home security service may include a communication subsystem, such as a dial-up router, and a gateway for monitoring a CCD camera, an intrusion sensor and a fire sensor. Such a system can be controlled or monitored by a server system installed in a network center. A home automation service may have a home gateway to control the controller of another computer system, a television, a video player, lights or an air conditioner.

The home security service or home automation service preferably supports subscriber access to the home systems through a network center, using a portable telephone or a portable information terminal (such as a PDA or Personal Digital Assistant), to confirm the security system is operating properly or to remotely control home devices, such as lights. The subscriber's operation is accepted as the registration of a job with the server system of the network center. Registered jobs are transmitted by the server to the home gateway, which then performs the job or predetermined process. The jobs registered with the server system are not limited to requests from a subscriber, and other jobs, such as a request from a security service provider for a confirmation of the monitoring state or a regularly programmed process, can be registered.

The following two methods are used to notify a home gateway of jobs that are registered with a network center. The first is a pseudo push (polling) method. The second is a remote access method. According to the pseudo push method, the home gateway periodically issues an inquiry to the network center to determine whether a new job is present in the server. According to the remote access method, the home system router is configured in advance as a remote access server (RAS). A server in the network center initiates a call to the home router to directly notify the home router of a new job. For the remote access method, a job is normally initiated as soon as it is received in the network center.

Both of these methods have disadvantages. For the pseudo push method, every telephone call to the network system is initiated at the home system. The cost (if any) of the calls is charged directly to the subscriber. Since the calls are automatically made at regular intervals, any telephone costs are incurred regularly regardless whether the network center has any pending jobs for the home system. Further, according to the pseudo push method, the intervals at which the calls are made to the network center must be relatively short if job requests are to be relayed quickly to the home gateway, which is something subscribers expect to have happen. However, a shorter interval means more telephone calls and potentially higher subscriber telephone costs. Further, even if a short interval doesn't increase telephone costs, frequent queries to the network server will increase the load imposed on the server, which could lead to delays in transmitting job requests to subscriber home gateways.

If the remote access method is to be used, a home router must be capable of responding to an incoming call by initiating some action. Configuring such a router can be a complicated task. Further, to make sure only authorized persons call in job requests, security techniques such as use of passwords must be implemented and managed. Implementation and management of security requirements itself increases the costs of the services.

Also, since the network center initiates each telephone call to the home system, any costs of the call are incurred by the center. To avoid calling costs, a so-called free callback function might be implemented. Specifically, upon receipt of a new job request, the network center calls a home router, but terminates the call without completing the connection once the router recognizes the calling number as one being associated with the network center. The home router then automatically places a call back to the calling number to permit transfer of the job request from the network center to the home system. Any communication costs are incurred by the subscriber. However, in order to implement this callback function, a network center must have multiple outgoing lines and communication adapters since any line used to place a call to a home system must be dedicated to that call until the called home router calls back and the job request is transferred from the network center to the home system.

It is one object of the present invention to permit job requests to be transmitted quickly from a network center to a home system without an excessively large facility investment being required for the center. It is another object of the present invention to facilitate the configuration of a home router and to quickly transmit a new job request without the imposition of security requirements. It is an additional object of the invention to quickly transmit a new job request without a communication charge being incurred by the network center. It is a further object of the present invention to provide a job notification system that can adjust the load imposed on the server.

SUMMARY OF THE INVENTION

When a job request is received at a network center, a callback request routine is initiated in the network center. A search is made for a telephone number associated with the home system in which the requested job is to be performed. A call is placed to the home system but is terminated once the calling number is transferred to the home system but before any connection is made. The home system responds to the call by establishing an Internet session with the network center through an Internet service provider. An HTTP (HyperText Transfer Protocol) request for job information is sent to the network center through the Internet link. Job information is returned to the home system as an HTTP response transmitted over the Internet session.

DESCRIPTION OF PREFERRED EMBODIMENT

Figure 1:
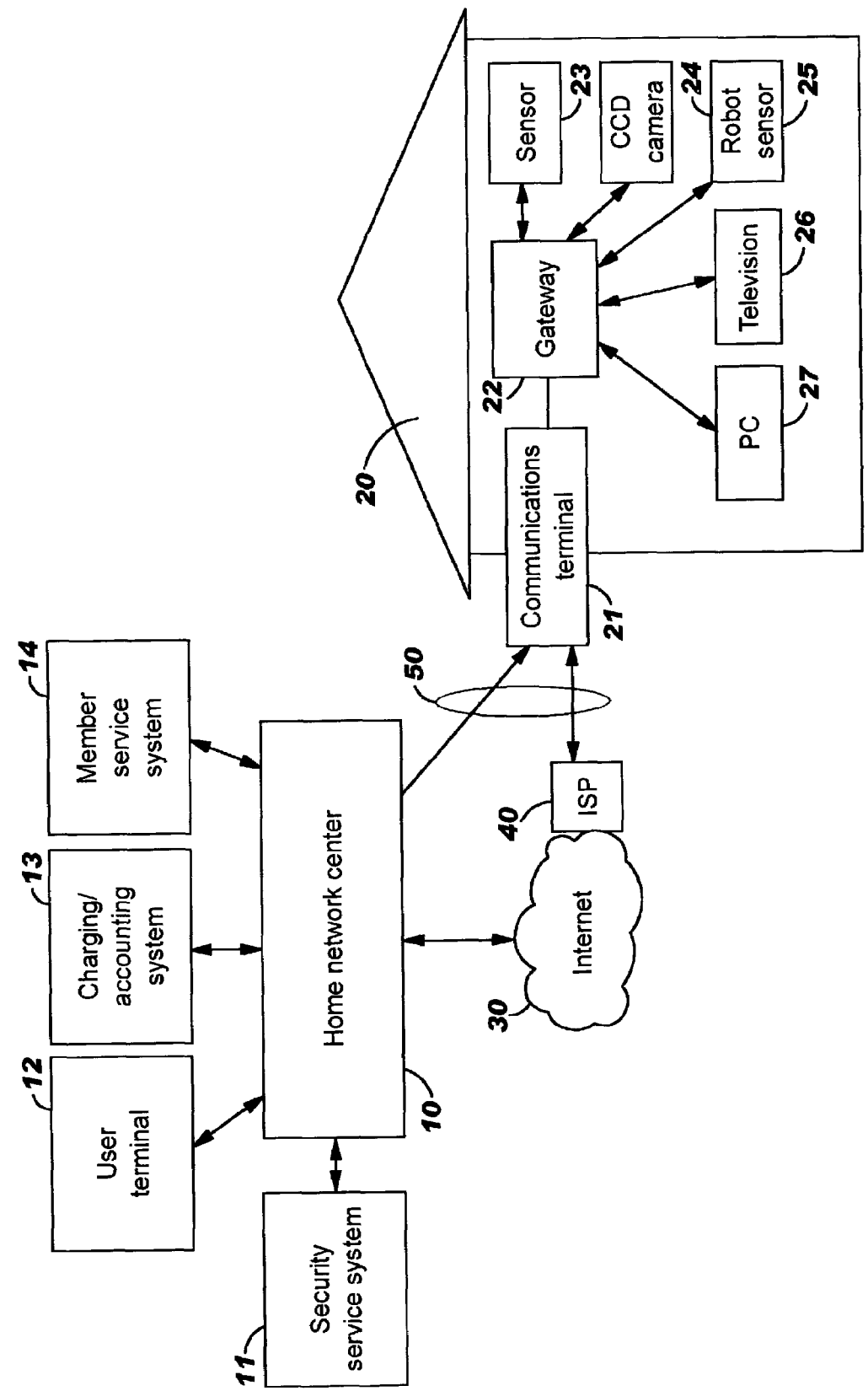
FIG. 1 is a block diagram showing one example of a system for implementing the present invention.

FIG. 1 is a diagram showing an example of a system configuration for implementing a job notification method according to the present invention. The system in this embodiment comprises a network center 10, a home system 20, the Internet 30, an Internet service provider (ISP) 40 and a public network 50. The network center 10 is connected to a security service system 11, a user terminal 12, such as a portable telephone or a PDA (Personal Digital Assistant), a charging/accounting system 13, and a member service system 14. The home system 20 that serves as a user system includes a communication terminal 21, a gateway (GW) 22, a sensor 23, a CCD (Charge Coupled Device) camera 24, a robot sensor 25, a television 26 and a PC (Personal Computer) 27.

The network center 10 provides the server function of a service provision system that employs a job notification method according to this embodiment. The network center 10 accepts, from the security service system 11, an inquiry for the current state of the security for each home, and accepts an inquiry, from a member employing the user terminal 12, such as a portable telephone or a PDA, for the status of one or more of the devices in each home. In addition, the network center 10 accepts and processes a data provision request issued by the charging/accounting system 13 of each member, and also accepts and processes a service request from the member service system 14. In this specification, the inquiries, the data provision requests and the other process requests accepted by the home network center 10 are commonly called jobs. That is, the network center 10 accepts a job request from a member, and registers the job.

When a new job is requested that must be performed in home system 20, the network center 10 notifies the gateway 22 of the home system 20 and transmits the job request in response to an inquiry received from the home system 20. The detailed functioning of the home network center 10 will be described later.

Only a single home system is shown in FIG. 1. Clearly, any commercial system would expect to serve multiple homes from a single network center. As will be described later, the home system 20 receives notice of a job request from the network center 10, and then the job request itself. The process required by the job request is performed in the home under the control of gateway 22 and the results transmitted to the network center 10.

The Internet 30 is one of the communication paths connecting the network center 10 and the home system 20. As is well known, the Internet 30 connects systems using standard communications protocols, for example, TCP/IP (Transmission Control Protocol/Internet Protocol). Systems connected through Internet 30 are identified by IP addresses.

The ISP (Internet Service Provider) 40 is a provider that allows devices in the home system 20 to be connected to Internet 30 either through a dial-up telephone connection or a continuous connection using a dedicated telephone line or a cable connection.

The public network 50 is typically a well known communication service network provided by a telephone company. The public network 50 may be either a digital communication form or an analogue communication form, and may be either wired or wireless. It should be noted, however, that as an assumption for the use of this invention, a caller number display function must be provided for the public network 50. An ISDN network is one example of the type of public network contemplated by this invention.

Communication terminal 21 is a data communication device, such as a dial-up router provided for the home system 20. In this embodiment, a dial-up router is employed as the communication terminal 21, but a terminal adapter or a modem having a reception function may be employed. Further, the communication terminal 21 of this embodiment includes a received call recording function, for recording the telephone number of a caller (caller number). Further, this communication terminal 21 includes the SYSLOG function for transmitting the call record (log) to the gateway 22.

Gateway 22 is an information processing apparatus provided for the home system 20, and controls communications with the network center 10. Upon receiving a request from the network center 10, the gateway 22 can return the status of sensors, such as sensor 23. Alternatively, gateway 22 can forward the sensor status information to network center 10 in accordance with a schedule programmed in advance. The gateway 22 will be described in more detail later.

The sensor 23, the CCD camera 24, the robot sensor 25, the television 26 and the PC 27 are examples of devices in a home system 20 that perform predetermined measurements under the control of the gateway 22. The sensor 23 may, for example, be an infrared sensor or proximity sensor used as an intrusion sensor. The CCD camera 24 may generate the image of a predetermined location. The robot sensor 25 has, for example, a self programming function, allowing it to implement a complicated monitoring action using a program. Television may be turned on or off by remote control, as an example. When a video system is connected to the television 26, a video recording can also be made by remote control. The PC 27 is a common personal computer system, and functions as the interface for the gateway 22. The devices controlled by the gateway 22 are not limited to those listed here.

Figure 2:
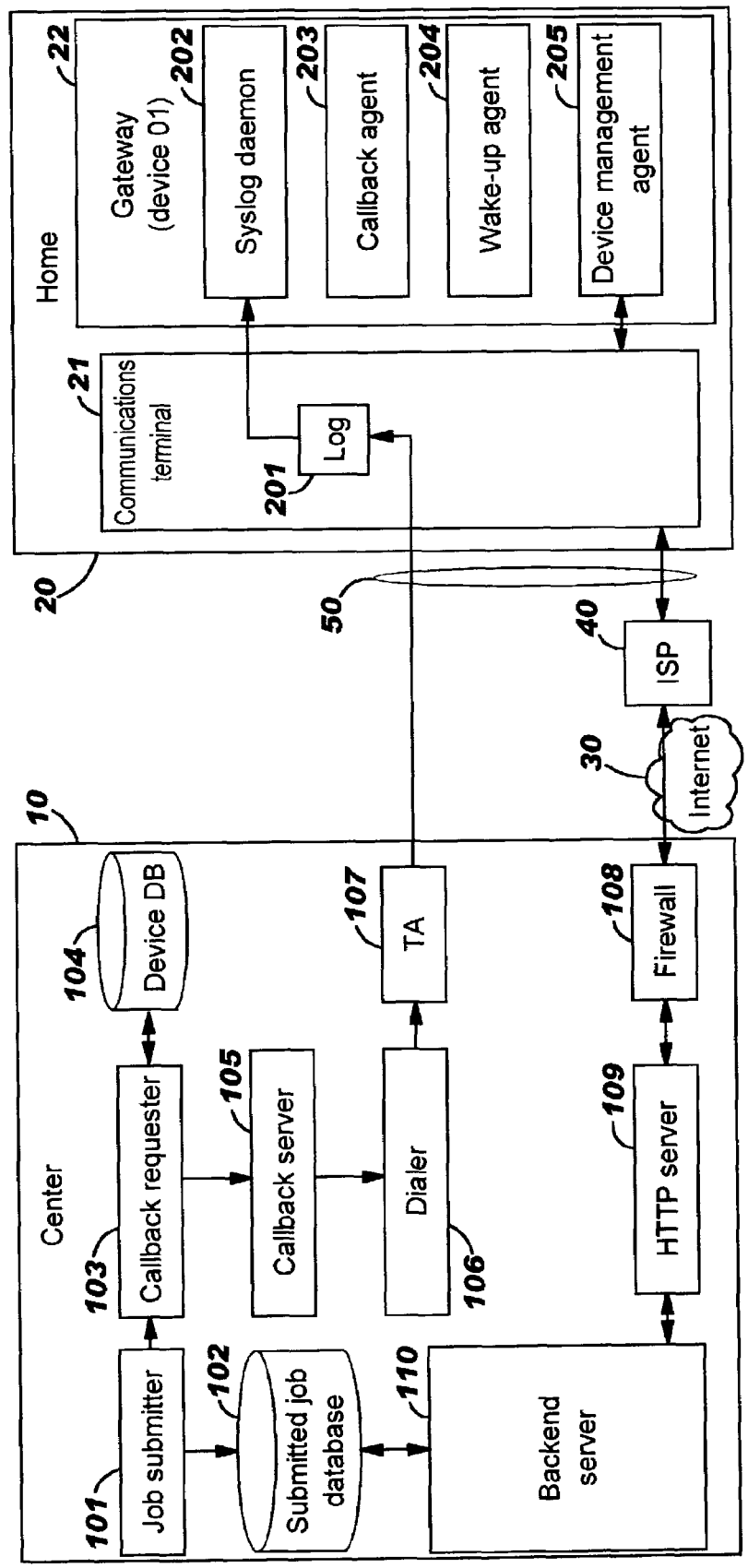
FIG. 2 is a functional block diagram showing further details of a network center and a home system for implementing the present invention.

FIG. 2 is a functional block diagram showing the network center 10, and the communication terminal 21 and the gateway 22 of the home system 20. The network center 10 includes a job submitter 101, a submitted job database 102, a callback requester 103, a device database 104, a callback server 105, a dialer 106, a terminal adapter (TA) 107, a firewall 108, an HTTP server 109 and a backend server 110. The communication terminal 21 includes a log 201. The gateway 22 includes a syslog daemon 202, a callback agent 203, a wake-up agent 204, and a device management agent 205.

The hardware configuration for the network center 10 and the gateway 22 can be a computer system comprising general hardware resources that include a central processing unit (CPU), a main memory (RAM), a nonvolatile memory (ROM), a co-processor, a cache memory, an input/output controller (I/O), an external storage device, such as a hard disk drive, and communication means that can be connected to a network, such as the Internet. The computer system includes any type of computer, such as a personal computer, a workstation or a mainframe computer. The network center 10 and the gateway 22 include an operating system or software, such as middleware, for utilizing these hardware resources.

The functions of the job submitter 101, the callback requester 103, the callback server 105, the dialer 106, the firewall 108, the HTTP server 109, the backend server 110, the syslog daemon 202, the callback agent 203, the wake-up agent 204 and the device management agent 205 are typically implemented as software components that are executed using the hardware resources. These software components can be provided by a combination of class programs that are written in a specific language, such as Java. A class program is an example of an object oriented program, but no limitation is intended on the programs that can be used for implementing the above functions. That is, the functions may be provided by using a programming technology other than an object oriented program technology.

The job submitter 101 has a function for receiving a request from, for example, the security service system 11, and for generating a process (job) for each request. A job generated by the job submitter 101 is registered in the submitted job database 102.

The callback requester 103 has a function for, when the job submitter 101 generates a job, generating a callback request. At this time, the callback request is generated for a device to which a call should be returned.

In the device database 104, the telephone number of the home system 20 includes a device that should be notified if a job is registered in correlation with the device. The callback requester 103 refers to the device database 104 to specify the telephone number of a device to which a job should be reported.

The callback server 105 performs the callback process upon receiving a request from the callback requester 103. Upon receiving a process request from the callback server 105, the dialer 106 performs a dialing operation for calling the terminal adapter 107.

The terminal adapter 107 has a function for dialing a telephone number included in a dialing request received from the dialer 106, and a function for converting communication data into a signal adjusted for a public network and performing a communication process. The terminal adapter 107 has a function for reporting the telephone number of a local station (caller number).

The firewall 108 is software for limiting the access of data transmitted across the Internet 30 to specific data or data based on a specific protocol. The firewall 108 is effective for preventing an unauthorized access by an external intruder; however, for this embodiment this is not requisite.

The HTTP server 109 has a function for transmitting a predetermined response for an HTTP request that is received. In this embodiment, the HTTP server 109 employs the CGI (Common Gateway Interface) function to request a process from the backend server 110.

The backend server 110 performs various processes requested by the network center 10. The backend server 110 has a function for extracting, from the submitted job database 102, a job that has been submitted and that the device should receive.

The communication terminal 21 is, for example, a dial-up router, as described above. The dial-up router generally controls data communication across a telephone line. For example, the communication terminal 21 has a function (a routing function) for automatically dialing a telephone number at a data destination, and for, when multiple telephone numbers (connection destinations) are registered, connecting to a telephone number corresponding to the IP address of the destination. Further, communication terminal 21 may include a function for accepting data upon the arrival of data. The communication terminal 21 in this embodiment is, however, configured to refused an incoming call and thus not to accept data. This configuration permits the home system 20 to be notified of the existence of a new job without the network center 10 being charged for a completed call. Further, since the home system 20 is configured to refuses incoming calls, the terminal adapter 107 of the network center 10 is needed for only a relatively short period of time before it is released to be used making a call to a different home system The communication terminal 21 can record an incoming call in a log 201. The call record can consist, for example, of a caller number, a call arrival date/time and a call arrival state. Further, the communication terminal 21 also has a function for employing the SYSLOG function to transmit the contents of the log 201 to another device, e.g., the gateway 22.

The syslog daemon 202 has a function for monitoring the log 201, and for, when a new call is recorded in the log 201, obtaining the contents. Further, when the contents of a new call are obtained, the syslog daemon 202 transmits the caller number to the callback agent 203.

Upon receiving a notification of the arrival of a new call, the callback agent 203 obtains the call number, and determines whether the call is from the network center 10 and was recorded in advance. When the call is from the network center 10, the callback agent 203 activates the wakeup agent 204.

The wake-up agent 204 activates the device management agent 205 upon receiving a start request from the callback agent 203. Device management agent 205, upon receiving the start request from the wake-up agent 204, is connected to the network center 10 and obtains the job registered in network center 10.

Figure 3:
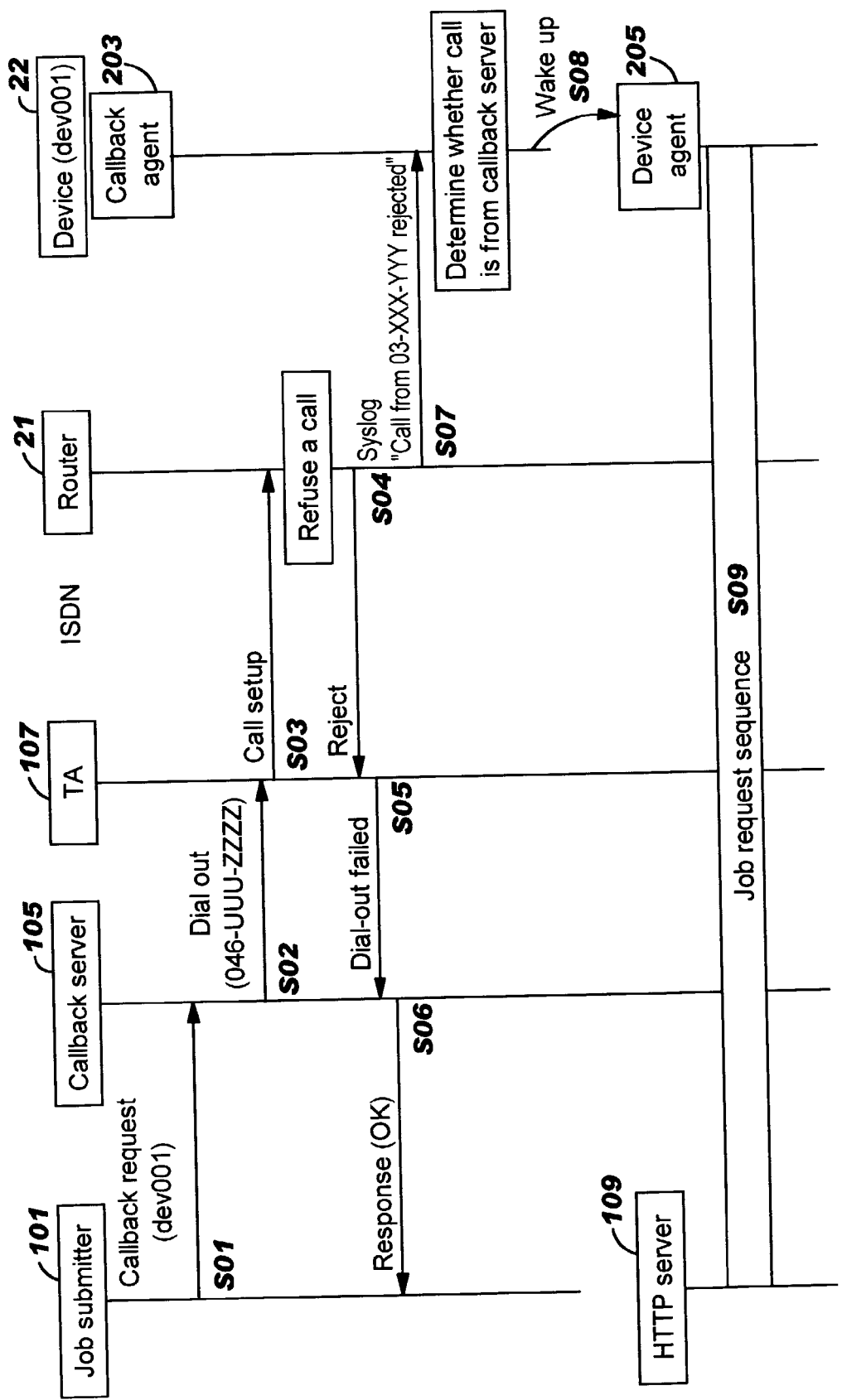
FIG. 3 is a flow sequence diagram showing message flows during the operation of systems that implement the present invention.

FIG. 3 is a diagram showing a sequence of operations carried out in the described embodiment of the invention. First, upon receiving a request from the security service system 11 or the portable telephone 12 of a user, the job submitter 101 issues a callback request to the callback server 105 (S01). The callback request is generated by the callback requester 103 and includes a device number (dev001 in FIG. 3).

Then, upon receiving the callback request, the callback server 105 refers to the device number to determine the telephone number for the call destination, and the dialer 106 issues a call command to the terminal adapter 107 (S02). The telephone number to be dialed is recorded for each device in the device database 104, and is searched for by the callback requester 103. In FIG. 3, the telephone number to be dialed is 046-UUU-ZZZZ. The search for the telephone number may be performed by the callback server 105.

Upon receiving the call command, the terminal adapter 107 dials a designated telephone number (S03). The communication terminal (router) 21 at the designated telephone number receives signals identifying an incoming call. Since, as is described above, the router is configured to refuse the call for the communication of data, the connection is not completed (S04) and a call-refused indication is returned to the caller. Upon receiving the call-refused indication from the router, the terminal adapter 107 transmits a "dial-out failed" message to the callback server 105 (S05). Upon receiving the dial-out failed message, the callback server 105 transmits an OK response to the job submitter 101 (S06).

Although the call to the home system 20 is not completed, information about the caller is still recorded in the log 201. A new record is obtained by the syslog daemon 202, and is transmitted to the callback agent 203 (S07). The callback agent 203 determines the caller number in the record, and when the call is from the callback server 105 of the home network center 10 (03-XXXX-YYYY is a caller number in FIG. 3), the wake-up agent 204 wakes up the device management agent 205 (S08).

Through the wake-up operation by the wake-up agent 204, the device management agent 205 understands that a new job request has been registered in the home network center 10. Using an Internet session, the device management agent issues an HTTP request to the network center 10 and obtains the new job request (S09).

The SYSLOG function employed to transmit the call arrival record (log 201) to the callback agent 203 is substantially the standard function for a common general router, and can be used in implementing the present invention without the need for special firmware.

A preferred embodiment of the invention has been described. However, the present invention is not limited to this embodiment, and can be variously modified without departing from the scope of the invention.

What is claimed is:

1. A method for communicating a job request received at a first system to a second remote system, said method being performed at the first system and comprising the steps of:
    initiating a telephone call to a telephone number associated with the second remote system, said telephone call including information indicating that a job request has been received for the second remote system, said second remote system being capable of logging the call information without completing the call;
    receiving a request for job information from the second remote system, said request taking the form of a HTTP request transmitted via a public computer network; and
    responding to the received HTTP request by sending job information to the second remote system via the public computer network.

2. A method as defined in claim 1 wherein the call information includes at least one telephone number associated with the first system.

3. A method for communicating a job request received at a first system to a second remote system, said method being performed at the second remote system and comprising the steps of:
    receiving an incoming telephone call;
    refusing to accept the call while logging call information;
    processing the logged call information to determine whether the call was a notification of a job request received at the first system that is intended for the second remote system; and
    if the call was a notification of such a job request, sending an HTTP request to the first system via a public computer network.

4. A method as defined in claim 3 wherein the step of processing the logged call information further includes the steps of:
    retrieving the caller telephone number from the logged call information;
    comparing the retrieved telephone number to one or more previously stored telephone numbers to determine whether the retrieved telephone number is associated with the first system; and
    continuing to the next step only if the results of the comparison are positive.

5. A method for communicating job requests received at a central system to one or more remote systems, said method comprising the steps of:
    receiving a job request at the central system intended for one of the remote systems;
    initiating a telephone call at the central system to a telephone number associated with the remote system for which the job request is intended, said telephone call including information indicating that a job request has been received for the called remote system;
    logging call information at the called remote system without completing the call connection;
    determining at the called remote system whether the call was placed from the central system;
    if the call was placed from the central system, generating an HTTP request at the called remote system;
    forwarding the HTTP request from the called remote system to the central system via a public computer network;
    receiving the HTTP request at the central system; and
    responding to the received HTTP request by sending job information to the second remote system in the form of an HTTP response via the public computer network.

6. A computer system for communicating a job request received at the computer system to a second remote system, said computer system including:
    a job submitter subsystem for receiving job requests from sources outside the computer system;
    a submitted job database for recording received job requests; a telephone subsystem for initiating a telephone call to a telephone number associated with the second remote system, the initiated telephone call including information indicating that a job request has been recorded for the called remote system;
    an HTTP server for receiving an HTTP request from the called remote system via a public computer network; and
    a backend server for responding to the HTTP request to retrieve job information from the submitted job database for inclusion in an HTTP response to be sent to the called remote system via the public computer network.

7. A remote computer system for receiving a job request submitted at a central system for the remote computer system, said remote computer system including:
    a communication terminal for receiving telephone calls via a public telephone network, said communication terminal including a log for recording incoming call information and call refusal logic for refusing the incoming call once the call information has been recorded in said log;
    logic for analyzing the recorded incoming call information to determine whether the call originated at the central system, for initiating generation of an HTTP request if it is determined that the call did originate at the central system, and for initiating transmission of the HTTP request to the central system via a public computer network.

8. A remote computer system as defined in claim 7 wherein the analyzing logic further includes:
    call processing logic for extracting a calling number from the recorded incoming call information; and
    comparison logic for comparing the extracted calling number to one or more telephone numbers previously recorded at the remote computer system.

9. A computer program product comprising a computer usable medium having a computer readable program embodied in said medium wherein the computer readable program when executed on a first computer system causes said first computer system to:
    initiate a telephone call to a telephone number associated with a second remote system, said telephone call including information indicating that a job request has been received for the second remote system, said second remote system being capable of logging the call information without completing the call;
    receive a request for job information from the second remote system, said request taking the form of a HTTP request transmitted via a public computer network; and respond to the received HTTP request by sending the job information to the second remote system via the public computer network.

10. A computer program product comprising a computer usable medium having a computer readable program embodied in said medium wherein the computer readable program when executed on a remote system causes said remote system to:

receive an incoming telephone call;

refuse to complete the call while logging call information;

process logged call information to determine whether the call was a notification of a job request received at a central system that is intended for said remote system; and if the call was a notification of such a job request, send an HTTP request to a remote system via a public computer network.

\* \* \* \* \*